US006742640B1

United States Patent
Grogg et al.

(10) Patent No.: US 6,742,640 B1
(45) Date of Patent: Jun. 1, 2004

(54) WRAP SPRING ACTIVATED TORQUE TRANSFER DEVICE

(75) Inventors: John Allen Grogg, LaOtto, IN (US); Jun Yoshioka, Fort Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/042,149

(22) Filed: Jan. 11, 2002

(51) Int. Cl.⁷ .............................................. F16D 13/12
(52) U.S. Cl. ...................... 192/35; 192/81 C; 475/231
(58) Field of Search ...................... 192/36, 35, 54.52, 192/70.23, 81 C, 41 S; 475/231, 240, 249, 237, 239

(56) References Cited

U.S. PATENT DOCUMENTS

| | | |
|---|---|---|
| 2,009,964 A | 7/1935 | Mottlau |
| 2,274,873 A | 3/1942 | Starkey |
| 2,534,034 A | 12/1950 | Brie |
| 2,886,985 A | 5/1959 | Meyer |
| 3,048,050 A * | 8/1962 | Perryman .................. 74/388 R |
| 3,177,995 A | 4/1965 | Mason |
| 3,637,056 A | 1/1972 | Baer |
| 3,684,068 A * | 8/1972 | Ford ......................... 192/41 S |
| 3,797,618 A | 3/1974 | Peterson et al. |
| 4,159,048 A | 6/1979 | Baxter et al. |
| 4,221,284 A * | 9/1980 | Hoff ....................... 192/12 BA |
| 4,270,637 A * | 6/1981 | Lowery ..................... 192/41 S |
| 4,330,054 A | 5/1982 | MacDonald |
| 4,793,453 A * | 12/1988 | Nishimura ................ 192/81 C |
| 4,817,771 A * | 4/1989 | Iten ........................... 192/81 C |
| 5,000,057 A | 3/1991 | Tseng |
| 5,029,689 A | 7/1991 | Grimm |
| 5,141,084 A | 8/1992 | Lang et al. |
| 5,325,950 A * | 7/1994 | Kimberlin ................ 192/81 C |
| 5,341,698 A | 8/1994 | Tseng |
| 5,353,901 A | 10/1994 | Jacques et al. |
| 5,399,129 A | 3/1995 | Ciolli |
| 5,437,205 A | 8/1995 | Tseng |
| 5,799,931 A | 9/1998 | Kish |
| 5,967,274 A * | 10/1999 | Leone et al. ............... 192/81 C |

* cited by examiner

Primary Examiner—Rodney H. Bonck
Assistant Examiner—Eric M. Williams
(74) Attorney, Agent, or Firm—Liniak, Berenato & White

(57) ABSTRACT

A wrap spring activated torque coupling is applied to a torque transmission coupling and/or a locking differential for a motor vehicle. The wrap-spring torque coupling allows for quick engagement and disengagement of an input member to an associated output member at large torsional capacities that exceed the limit of what is taught by prior art. The ability to quickly lock and unlock a vehicle differential under either a torsionally loaded or unloaded condition is realized by this application of the wrap spring activated torque coupling. Moreover, a two piece bi-directional wrap spring hub design is utilized that allows for simple turning and broaching operations for use in its manufacture, thereby eliminating a conventional deep annular counterbore that would require the use of much more expensive machining processes.

28 Claims, 5 Drawing Sheets

WRAP SPRING ACTIVATED TORQUE TRANSFER DEVICE

BACKGROUND OF THE INVENTION

1. Field of the Invention

The present invention relates to a wrap spring activated torque coupling applied to a torque transmission coupling and/or a locking differential for a motor vehicle.

2. Description of Related Art

Torque applied to a tire through a drive shaft propels a vehicle by the friction between the tire and the surface of the road for the vehicle. Occasionally, slip takes place between the road surface and the tire. The ratio of the slip depends on the coefficient of friction between the tire and the road surface. The coefficient of friction fluctuates due to the states of the road surface and the tire, and the ratio of slip depends in part on the grounding load upon the tire, the magnitude of the torque transmitted to the tire, the driving speed of the vehicle, and so forth.

As for an ordinary two-wheel-drive vehicle, high torque is transmitted to each driving wheel through a transmission at the start of the vehicle so that a large slip could take place between the road surface and the tire of the wheel. The torque transmitted through the transmission decreases as the driving speed of the vehicle rises, so that the ratio of the slip falls.

When the torque transmitted to the tire is so high that the tire slips, the torque does not fully act to propel the vehicle, resulting in wasted motive power, lowered fuel efficiency, and adverse vehicle handling.

When the fluctuation in the coefficient of friction is large or the coefficient of friction is very small, as on a muddy road, a partially icy road, a snowy road, a graveled road, or the like, the stability of movement of the vehicle is reduced and the stopping distance increases in the case of locking of the wheel in braking. Moreover, it is sometimes difficult to maintain the direction of movement of the vehicle in the case of locking of the rear wheel (in particular, in braking).

For the above-mentioned reasons, four-wheel-drive vehicles have become popular vehicles for driving on a wide range of road conditions. In four-wheel-drive vehicles, the driving power of an engine is dividedly transmitted to four wheels to eliminate the above-mentioned drawbacks and problems.

Since a rotation speed difference arises between the front and rear wheels of the four-wheel-drive vehicle due to the turning radius difference between the front and the rear wheels at the time of turning of the vehicle, torsional torque is caused (a tight corner braking phenomenon) between the drive shafts for the front and the rear wheels if the turning is performed on a high friction-coefficient road (such as a paved road), on which the driving wheel and the surface of the road are less likely to slip relative to each other. For that reason, different types of four-wheel-drive vehicles have been developed in order to prevent the deterioration of the moving property of each vehicle due to the torsional torque, the increase in the wear of the tire, the shortening of the life of the vehicle, and so forth.

One of the different types of four-wheel-drive vehicles is a part time four-wheel-drive vehicle in which the driver shifts from the four-wheel drive mode to the two-wheel drive mode when running on a high-friction-coefficient road such as a paved road. Another type of four-wheel-drive vehicle is a full time-four-wheel-drive or all-wheel-drive vehicle equipped with a center differential unit for dividedly transmitting motive power to a front and a rear wheel drive shafts. Another type of four-wheel-drive vehicle is a full time-four-wheel-drive vehicle in which the front or rear wheels are always driven and in which the rear or front wheels are driven through a viscous clutch which transmits torque by the viscosity of silicone oil or the like.

Although the part time-four-wheel-drive vehicle can be manufactured at a relatively low cost, it is troublesome to shift between the two-wheel drive and the four-wheel drive and it is likely that the vehicle is slowly turned when the driver mistakenly fails to properly choose between four-wheel drive and two-wheel drive. It is less likely that every driver can precisely predict the occurrence of slip of the driving wheel and take appropriate action.

Full time-four-wheel-drive vehicles, that are equipped with the center differential unit, have a front wheel drive differential unit, which dividedly transmits motive power to the right and left front wheels, and a rear wheel drive differential unit, which dividedly transmits motive power to the right and left rear wheels. These full-time four-wheel-drive vehicles suffer from a problem that no motive power is transmitted to any of the remaining three of four driving wheels when one wheel is caused to spin or loses the tire grip due to overhanging on the road side or ditch, a slip on an icy road, or the like. For that reason, the center differential unit is provided with a differential locking mechanism. The differential locking mechanism is of the mechanical type or the electronic control type. In the mechanical type, a differential rotation, which takes place in the center differential unit, is stopped through manual shifting when no motive power is transmitted to the three of the four driving wheels in order to put the vehicle into the state of direct-connection four-wheel drive. In the electronic control type, the speed of the vehicle, the angle of turning of the vehicle, the racing of the drive shaft, and so forth are detected by sensors in order to put the differential locking mechanism into a locking or unlocking state through an electronic controller. As for the mechanical type, it is difficult to set a differential locking start time point, the time point cannot be changed depending on the moving condition of the vehicle, and it is more difficult to automate the differential locking mechanism. As for the electronic control type, a device for controlling the differential locking mechanism is more complex and the cost of production of the mechanism is very high.

Since the center differential unit comprises an input shaft which receives motive power transmitted from an engine through a transmission, a differential case connected to the input shaft, a pinion shaft which is driven by the differential case, pinions rotatably attached to the peripheral surface of the pinion shaft, a first side gear which is engaged with the pinion and connected to a first differential means for driving the front or rear wheels, a second side gear which is engaged with the pinion and connected to a second differential means for driving the rear or front wheels, and the differential locking mechanism which engages the differential case and the side gear with each other through mechanical operation or electronic control, the cost of production of the center differential unit is very high and the weight of the vehicle is increased.

It is also known to replace the aforementioned center differential with a torque transmission coupling that includes an input shaft drivingly connected to the transmission and a first differential, an output shaft drivingly connected to a second differential, an oil pump driven by the relative rotation between the input and the output shafts to generate oil pressure corresponding to the speed of the relative rotation, and a friction clutch mechanism engaging the input shaft and the output shaft with each other by the oil pressure generated by the oil pump. The torque transmitted by the torque coupling is proportional to the speed of the relative rotation. When the rotation speed of the wheels driven by the first differential is higher than that of the wheels driven by the second differential, a rotation speed difference takes place between the input and the output shafts. The oil pump generates the oil pressure corresponding to that rotation speed difference. The oil pressure is applied to the friction clutch mechanism so that torque is transmitted from the input shaft to the output shaft depending on the magnitude of the oil pressure. When torque is transmitted to the second differential, the rotation speed of the wheels drivingly connected to the second differential is raised to approach that of the wheels driven by the first differential, thereby reducing the rotation speed difference between the input and the output shafts. In short, the torque transmission coupling operates in response to the rotation speed difference that takes place depending on the environmental situation of the vehicle and the moving conditions thereof. In other words, a prescribed slip is always allowed.

The need exists for a high torque coupling device and/or a high torque all wheel drive differential device capable of being quickly engaged and dis-engaged under either a torsionally loaded or non-loaded condition. The need also exists for a cost-effective and efficient torque coupling that uses a wrap spring.

SUMMARY OF THE INVENTION

This invention allows for quick engagement and disengagement of an input member to an associated output member at large torsional capacities that exceed the limit of what is taught by prior art.

The ability to quickly lock and unlock a vehicle differential under either a torsionally loaded or unloaded condition is realized by this application of the wrap spring activated torque coupling.

This invention utilizes a two piece bi-directional wrap spring hub design that allows for simple turning and broaching operations for use in its manufacture. Other one-piece hub designs require a deep annular counterbore that would require the use of much more expensive machining processes.

It is thus the object of the present invention to provide a wrap spring activated torque coupling applied to a torque transmission coupling and/or a locking differential for a motor vehicle.

DETAILED DESCRIPTION OF PREFERRED EMBODIMENTS

Figure 1:
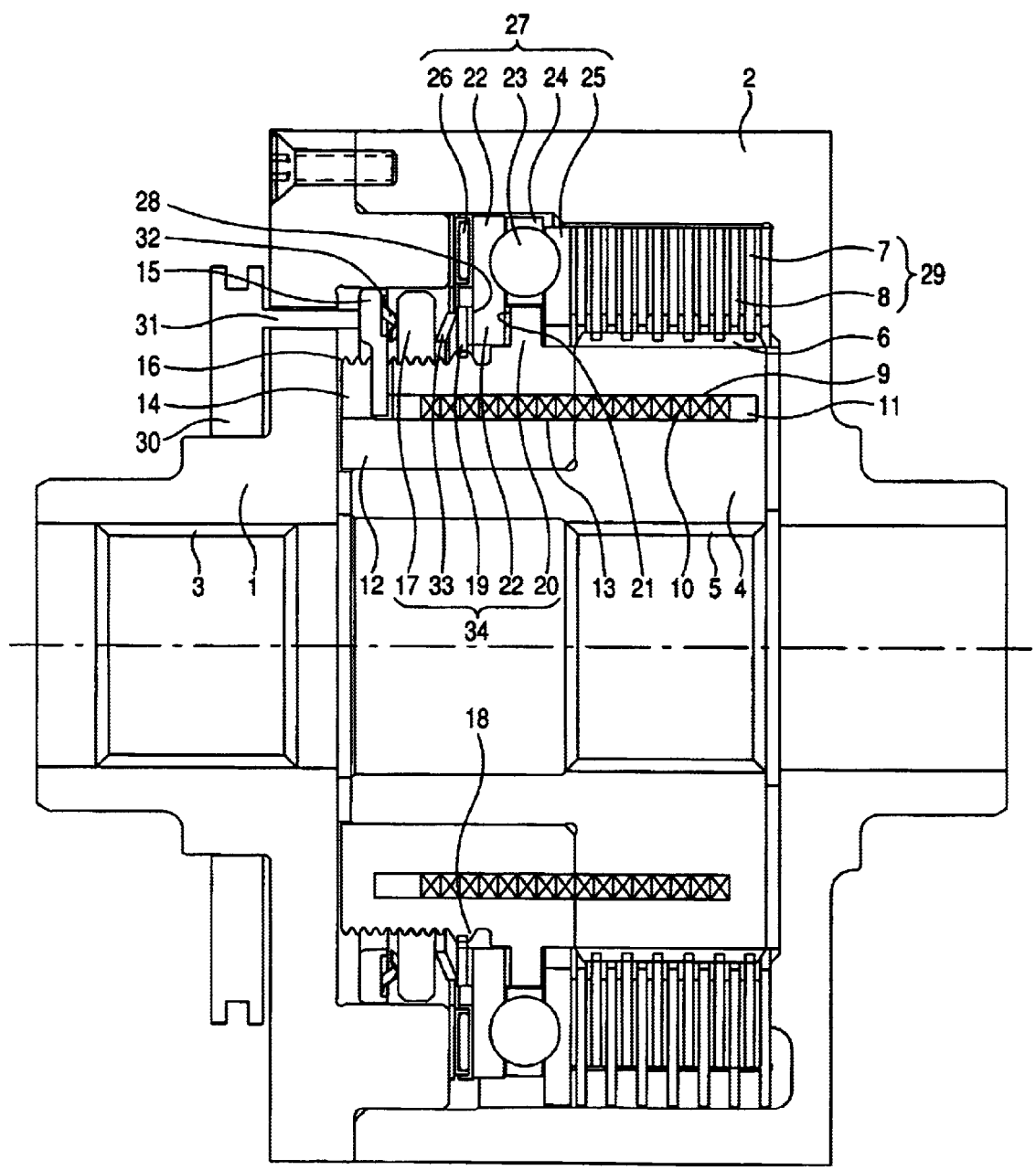
FIG. 1 is an axial cross-section of the wrap spring activated torque coupling made in accordance with the teachings of the present invention, in an engaged condition.

FIG. 1 is an axial cross-section of the wrap spring activated torque coupling made in accordance with the teachings of the present invention, in an engaged condition. FIG. 1 is not intended to limit this invention.

The wrap spring torque coupling is comprised of an input hub 1, which is attached to an outer housing 2. The input hub 1 is capable of being driven at its spline interface 3.

Output spline collar 4 is disposed within input hub 1 and outer housing 2 and has two splined interfaces 5 and 6 which are capable of driving an output shaft at spline interface 5 and also being driven by clutch discs 7 at spline interface 6. Output spline collar 4 also has an annular counterbore 9 which provides for a close clearance fit (on both the outside and inside diameters) with one side of the wrap spring 10. Output spline collar 4 also has an additional counterbore 11 within which one end of the wrap spring 10 is disposed.

Wrap spring hub 12 has an annular counterbore 13, which provides a close clearance fit (on both the outside and inside diameters) with one side of the wrap spring 10. One or more notched areas 14 exist to allow access from the counterbore 13 to the outside diameter of wrap spring hub 12. Notch 14 allows for contact between control pin collar 15 and an end of wrap spring 10. A threaded region 16 exists on one end of wrap spring hub 12 for engagement with thread ring 17. Spline interface 18 also exists on wrap spring hub 12 for contact with pilot clutch disc 19. Annular ring area 20 also exists on wrap spring hub 12 for use as a friction surface and a positive clamping surface at surface 21.

Ball ramp mechanism 27 disposed between outer housing 2 and wrap spring hub 12 is composed of pilot clutch ramp 22, balls 23, ball separator plate 24, primary clutch ramp 25, and thrust bearing assembly 26. Thrust bearing assembly 26 in contact with input hub 1 provides a stiff low friction surface to interface with pilot clutch ramp 22. Pilot clutch ramp 22 has bi-directional radial profile ramp surfaces for contact with balls 23 and also provides for pilot clutch friction surfaces 21 and 28.

Ball separating plate 24 maintains proper spacing between a plurality of balls 23. Primary clutch ramp 25 has bidirectional radial profile ramp surfaces for contact with ball 23 as well as a contact surface for loading primary clutch pack 29.

Primary clutch pack 29 is made up of a plurality of alternating discs 7 and plates 8, of which discs 7 are splined to output spline collar 4 and plates 8 which are splined to the outer housing 2.

A control ring 30, which contains at least one or more pins 31, is mounted on the input hub 1. Pins 31 have a sliding end contact with control pin collar 15 enabling axial movement of control ring 30 to in-turn move control pin collar 15 against a bias spring 32.

Pilot clutch mechanism 34 is composed of threaded ring 17 which when threaded on wrap spring hub 12 compresses bias spring 33 which in turn places a thrust load between pilot clutch disc 19, pilot clutch ramp 22, and annular ring area 20. This arrangement creates a slip clutch between wrap spring hub 12 and pilot clutch ramp 22.

While in the engaged position as shown in FIG. 1, the wrap spring activated torque coupling operates in the following manner:

Input torque is provided to input hub 1 at spline interface 3 and that torque is further distributed to outer housing 2. Outer housing 2 then distributes that torque to both plates 8 and primary clutch ramp 25. As primary clutch ramp 25 attempts to rotate, the ramped radial contact surfaces of ramp 25 with balls 23 cause primary clutch ramp 25 to be urged axially against the first plate 8 of the primary clutch pack 29. This in turn loads the primary clutch pack 29, and in doing so additional torque is transferred from outer housing 2 through primary clutch pack 29 and on to output spline collar 4 where it is distributed for use through spline interface 5.

Balls 23 are able to resist radial movement against primary spline ramp 25 due to the interaction of the pilot clutch 34 with wrap spring hub 12. When balls 23 are urged to rotate by primary clutch ramp 25 the radial ramped contact surface between balls 23 and pilot clutch ramp 22 bears against balls 23 forcing the balls 23 in the axial direction. This axial force is quite significant and pilot clutch ramp 22 is axially supported through thrust bearing assembly 26.

Pilot clutch ramp 22 obtains its radial resistance to movement through pilot clutch 34. Threaded ring 17 pushes upon bias spring 33 and this resultant force is in-turn felt through pilot clutch disc 19 and pilot clutch ramp 22. Annular ring area 20 provides a solid stop to resist this axial force. This axial force normal to friction surfaces 21 and 28 creates a slip clutch transferring torque from wrap spring hub 12 to pilot clutch ramp 22.

Wrap spring hub 12 is coupled to output spline collar 4 through wrap spring 10 (while in the engaged condition). When wrap spring hub 12 is urged to rotate, it in turn urges wrap spring 10 to rotate (due to the solid connection between wrap spring hub 12 and wrap spring 10 while control pin collar 15 is in the engaged position). As the one end of wrap spring 10 is rotated with respect to it's other end, the wrap spring 10 wraps either up or down (dependant upon its direction of rotation) and in doing so the wrap spring 10 grabs output spline collar 4 making a solid connection between wrap spring hub 12 and output spline collar 4.

Disengagement of the coupling is accomplished quickly by allowing control ring 30 to move axially away from the input hub 1. This is accomplished by allowing spring 32 to move control pin collar 15 towards the input hub 1 pushing through pins 31. As control pin collar 15 moves toward the input hub 1, the collar 15 no longer contacts the end of wrap spring 10, thus allowing that end of the wrap spring 10 to rotate freely within wrap spring hub 12 and in effect de-couples the wrap spring hub 12 from the output spline collar 4. When this occurs there is now no rotational reaction forces exerted upon pilot clutch ramp 22 to resist the rotation of balls 23 and therefore the resultant axial load that had been present on the primary clutch pack 29 is now gone, therefore primary clutch pack 29 freely slips and no torque is transferred.

Disengagement of the coupling is in effect independent of what the torsional load is on the coupling.

Re-engagement is simply done by moving control collar 30 back towards input hub 1. This can be done quickly with a small force.

Figure 2:
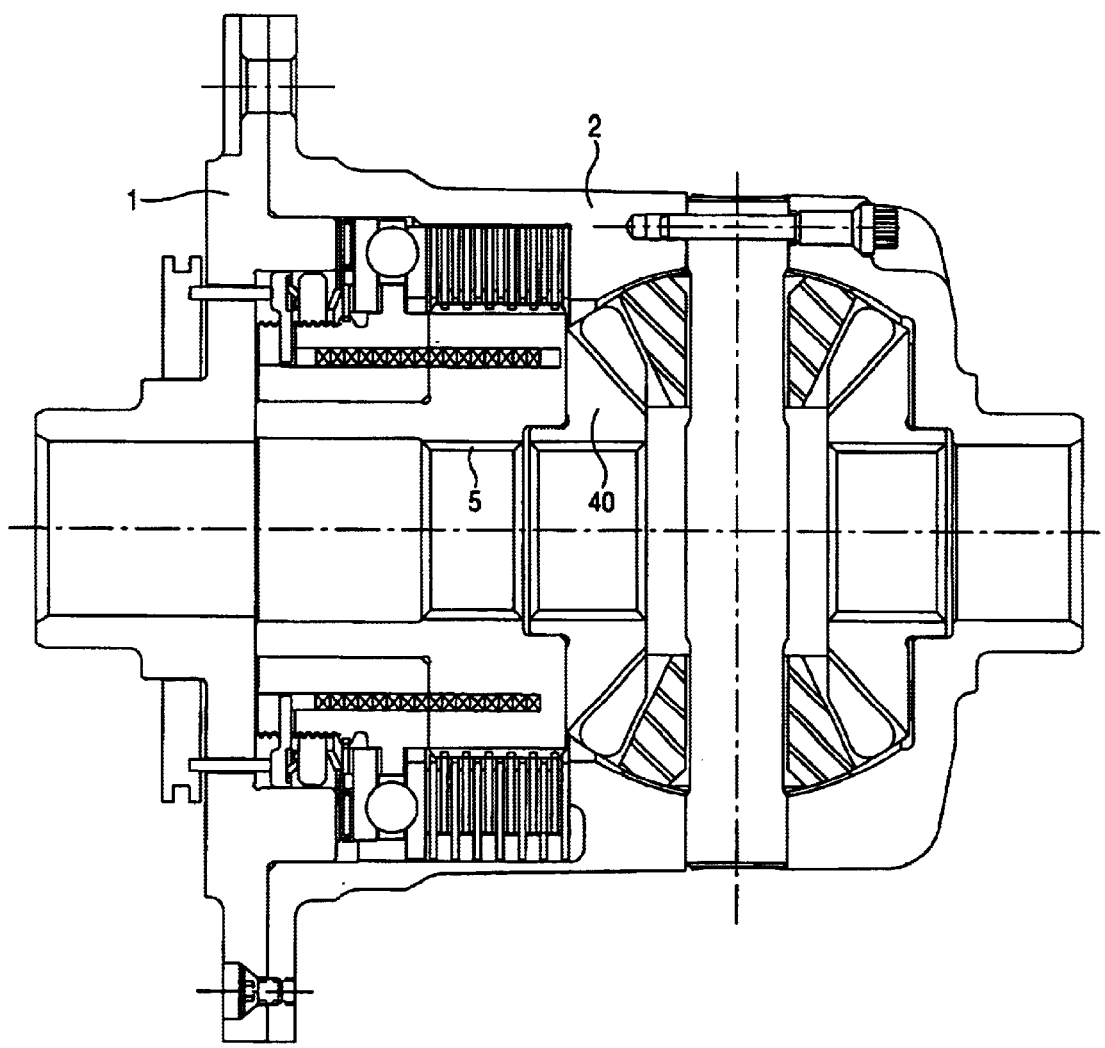
FIG. 2 is an axial cross-section of a wrap spring activated locking differential made in accordance with the teachings of the present invention, in an engaged condition.

FIG. 2 is an axial cross-section of a wrap spring activated locking differential made in accordance with the teachings of the present invention, in an engaged condition. FIG. 2 is not intended to limit this invention or limit the application of this invention.

Operation of the wrap spring activated locking differential of FIG. 2 is similar to that of the wrap spring activated torque coupling of FIG. 1 with the following differences. Input hub 1 has been altered to allow for connection to a ring gear for torque input instead being driven by a spline interface. Output spline collar 4 is capable of being coupled to a bevel gear 40 (through it's spline interface 5) in what would be one part of a normal differential mechanism. This same arrangement is capable of being done also with a planetary differential mechanism. Outer housing 2 has also been expanded to house either a bevel gear or planetary gear arrangement, with most notable interaction with the pinion mate (or planet gears as related to a planetary gear set).

Figure 3:
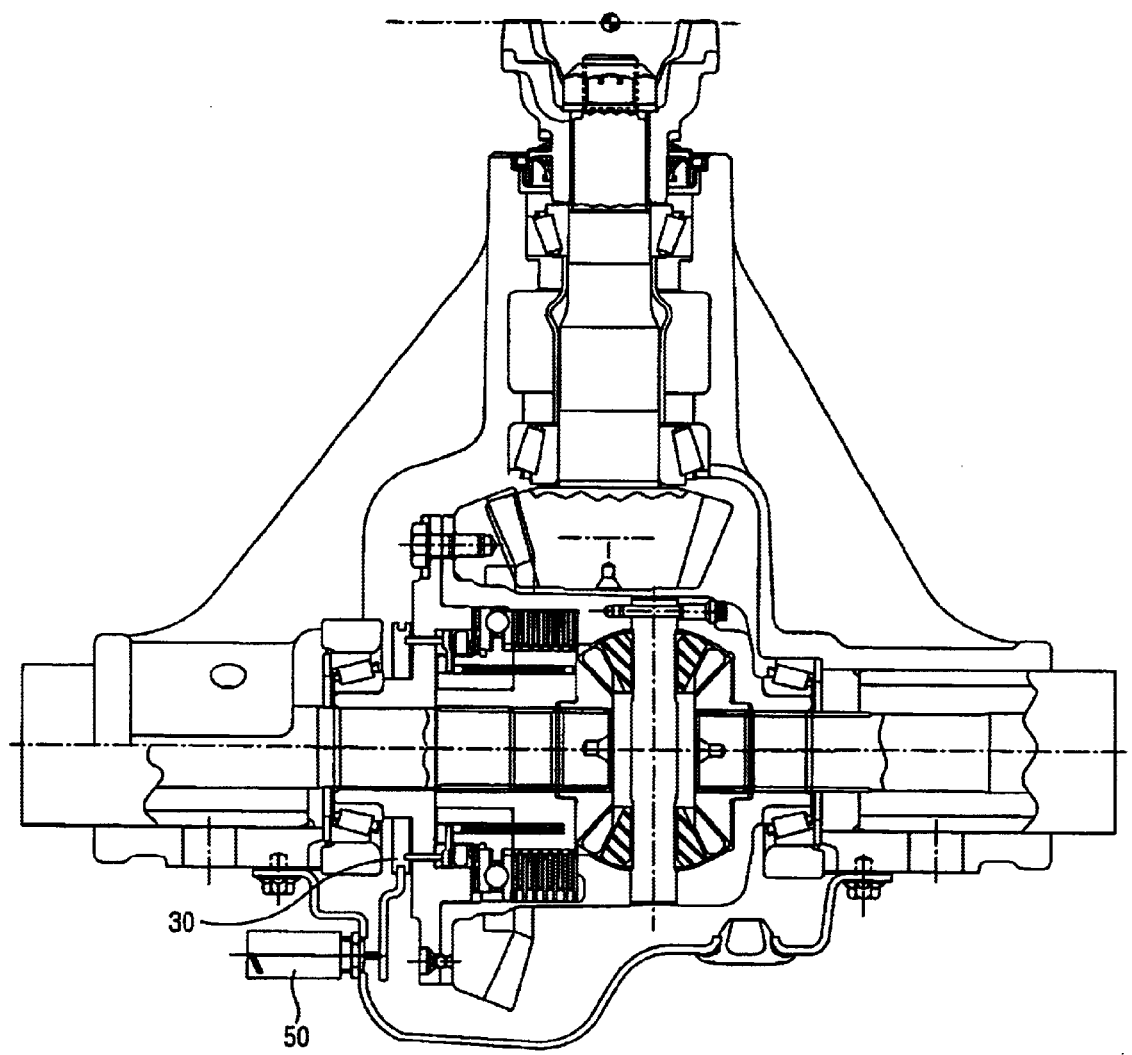
FIG. 3 is an axial cross-section of a wrap spring activated locking differential as assembled within the axle of a vehicle.

FIG. 3 is an axial cross-section of a wrap spring activated locking differential as assembled within the axle of a vehicle. FIG. 3 is not intended to limit this invention or limit the application of this invention. Also shown in this figure is an actuator 50 for positioning the control ring 30. In this specific figure the actuator is an electrically powered one. However, other suitable actuators are readily available to perform the same purpose as envision in this FIG. 3.

While the wrap spring activated locking differential of FIG. 2 and FIG. 3 is in the disengaged position, torque is transferred from the differential axle ring gear to the output shafts through a normal open differential. This allows for un-impeded differentiation to occur between the output shafts. The result of which is previously known through prior art.

However, when the wrap spring activated locking differential of FIG. 2 and FIG. 3 is in the engaged position, torque is transferred from the differential axle ring gear to the output shafts, however now the output shafts are locked together and differentiation is impeded. This results in what is known as a locked differential and can greatly increase the mobility of a vehicle because torque is evenly distributed between the right and left output shafts.

The ability to quickly lock and unlock a vehicle differential under either a torsionally loaded or unloaded condition is realized by this application of the wrap spring activated torque coupling.

This invention also applies the concepts described above with respect to a torque coupling of an all wheel drive differential, which allows this invention to be quickly engaged and disengaged under torsional loads that exceed the limits of prior art.

This invention utilizes a two piece bi-directional wrap spring hub design that allows for simple turning and broaching operations for use in its manufacture. Other one-piece hub designs require a deep annular counterbore that would require the use of much more expensive machining processes.

Figure 4:
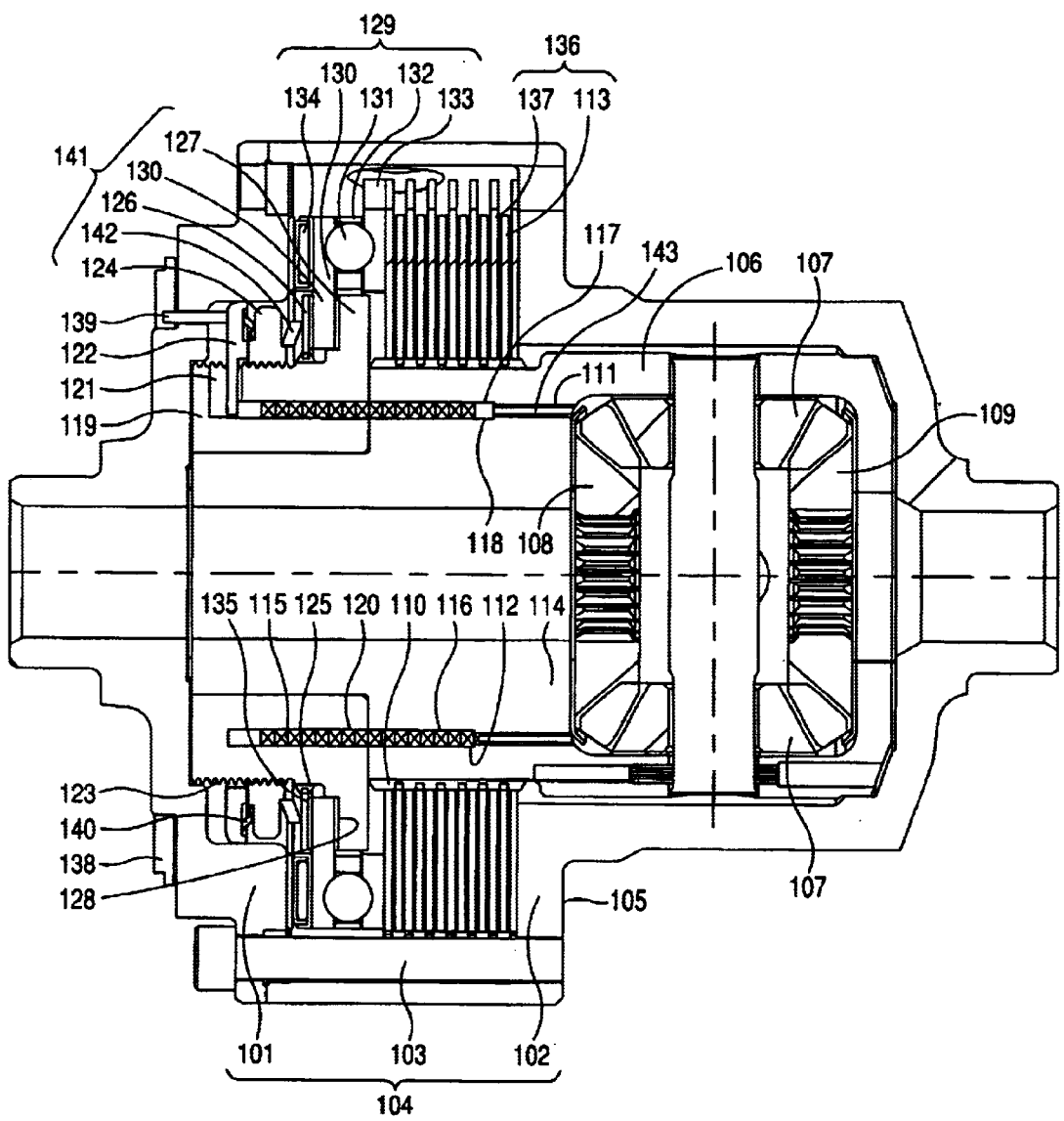
FIG. 4 is an axial cross-section of the wrap spring all wheel drive differential made in accordance with the teachings of the present invention, in an engaged condition.

FIG. 4 is an axial cross-section of the wrap spring all wheel drive differential made in accordance with the teachings of the present invention, in an engaged condition. FIG. 4 is not intended to limit this invention.

The wrap spring activated all wheel drive differential is comprised of an outer case flange half 101 which is attached to outer case cap half 102 through the use of fasteners 103 making up the outer differential case 104. The outer differential case 104 is capable of being driven at its flange face 105 through a vehicle axle ring gear (not shown).

Inner differential case 106 houses a set of bevel gears 107 that mate with side gears 108 and 109, which are capable of being attached to vehicular axle output shafts (not shown) in a conventional manner. Inner differential case 106 also possesses splined regions 110 (for torque transfer with discs 113) and 111 (for attachment to inner wrap spring hub 114), as well as diametrical surface 112 which provides a close fit with wrap spring 115. A notched area 117 is also provided in inner differential case 106 for partial capture of one end of wrap spring 115.

Inner wrap spring hub 114 provides axial support for side gear 108 and also provides diametric surface 116 which provides a close fit with wrap spring 115. A notched area 118 is also provided in inner wrap spring hub 114 for partial capture of one end of wrap spring 115. Spline interface 143 located on inner wrap spring hub 114 provides for torsional engagement with inner differential case 106.

Wrap spring hub 119 has an annular counterbore 120, which provides a close clearance fit (on both the outside and inside diameters) with one side of the wrap spring 115. One or more notched areas 121 exist to allow access from the counterbore 120 to the outside diameter of wrap spring hub 119. Notch 121 allows for contact between control pin collar 122 and an end of wrap spring 115. A threaded region 123 exists on one end of wrap spring hub 119 for engagement with thread ring 124. Spline interface 125 also exists on wrap spring hub 119 for contact with pilot clutch disc 126. Annular ring area 127 also exists on wrap spring hub 119 for use as a friction surface and a positive clamping surface at surface 128.

Ball ramp mechanism 129 disposed between outer differential case 104 and wrap spring hub 119 is composed of pilot clutch ramp 130, balls 131, ball separator plate 132, primary clutch ramp 133, and thrust bearing assembly 134. Thrust bearing assembly 134 in contact with outer case flange half 101, provides a stiff low friction surface to interface with pilot clutch ramp 130. Pilot clutch ramp 130 has bi-directional radial profile ramp surfaces for contact with balls 131 and also provides for opposing pilot clutch friction surfaces 128 and 135. Ball separating plate 132 maintains proper spacing between a plurality of balls 131. Primary clutch ramp 133 has bi-directional radial profile ramp surfaces for contact with ball 131 as well as a contact surface for loading primary clutch pack 136.

Primary clutch pack 136 is made up of a plurality of alternating discs 113 and plates 137, of which discs 113 are inner splined with differential case 106 and plates 137 which are splined to the outer differential case 104.

A control ring 138, which contains at least one or more pins 139, is mounted on the outer case flange half 101. Pins 139 have a sliding end contact with control pin collar 122 enabling axial movement of control ring 139 to in-turn move control pin collar 122 against a bias spring 140.

Pilot clutch mechanism 141 is composed of threaded ring 124 which when threaded on wrap spring hub 119 compresses bias spring 142 which in turn places a thrust load between pilot clutch disc 126, pilot clutch ramp 130, and annular ring area 127. This arrangement creates a slip clutch between wrap spring hub 119 and pilot clutch ramp 130.

While in the engaged position as shown in FIG. 4, the wrap spring activated all wheel drive differential operates in the following manner:

Input torque is provided to outer differential case 104 at flange interface 105. Outer differential case 104 then distributes that torque to plates 137 and primary clutch ramp 133. As primary clutch ramp 133 attempts to rotate, the ramped radial contact surfaces engage with balls 131 to cause primary clutch ramp 133 to be urged axially against the first plate 137 of the primary clutch pack 136. This in turn loads the primary clutch pack 136, and in doing so additional torque is transferred from outer differential case 104 through primary clutch pack 136 and on to inner differential case 106 where it is distributed for use through side gears 108 and 109.

Balls 131 are able to resist radial movement against primary spline ramp 133 due to the interaction of the pilot clutch 141 with wrap spring hub 119. When balls 131 are urged to rotate by primary clutch ramp 133, the radial ramped contact surface between balls 131 and pilot clutch ramp 130 bears against balls 131 forcing the balls 131 in the axial direction. This axial force is quite significant and pilot clutch ramp 130 is axially supported through thrust bearing assembly 134.

Pilot clutch ramp 130 obtains its radial resistance to movement through pilot clutch 141. Threaded ring 124 pushes upon bias spring 142 and this resultant force is in-turn felt through pilot clutch disc 126 and pilot clutch ramp 130. Annular ring area 127 provides a solid stop to resist this axial force. This axial force normal to friction surfaces 128 and 135 creates a slip clutch transferring torque from wrap spring hub 119 to pilot clutch ramp 130.

Wrap spring hub 119 is coupled to inner differential case 106 and inner wrap spring hub 114 through wrap spring 115, while in the engaged condition. When wrap spring hub 119 is urged to rotate, it in turn urges wrap spring 115 to rotate due to the solid connection between wrap spring hub 119 and wrap spring 115 while control pin collar 122 is in the engaged position. As the one end of wrap spring 115 is rotated with respect to it's other end, the wrap spring 115 wraps either up or down (dependant upon its direction of rotation) and in doing so grabs either inner differential case 106 or inner wrap spring hub 114 making a solid connection between wrap spring hub 119 and inner differential case 106.

Disengagement of the coupling is accomplished quickly by allowing control ring 138 to move axially away from the outer case flange half 101. This is accomplished by allowing spring 140 to move control pin collar 122 towards the outer case flange half 101 pushing through pins 139. As control pin collar 122 moves toward the outer case flange half 101 it no longer contacts the end of wrap spring 115, which allows that end of the wrap spring 115 to rotate freely within wrap spring hub 119 and in effect de-couples the wrap spring hub 119 from the inner differential case 106. When this occurs there is now no rotational reaction forces exerted upon pilot clutch ramp 130 to resist the rotation of balls 131 and therefore the resultant axial load that had been present on the primary clutch pack 136 is now gone, therefore primary clutch pack 136 freely slips and no torque is transferred.

Disengagement of the coupling is in effect independent of the components bearing the torsional load.

Re-engagement is simply done by moving control collar 138 back towards outer case flange half 101. This can be done quickly with a small axial force.

Figure 5:
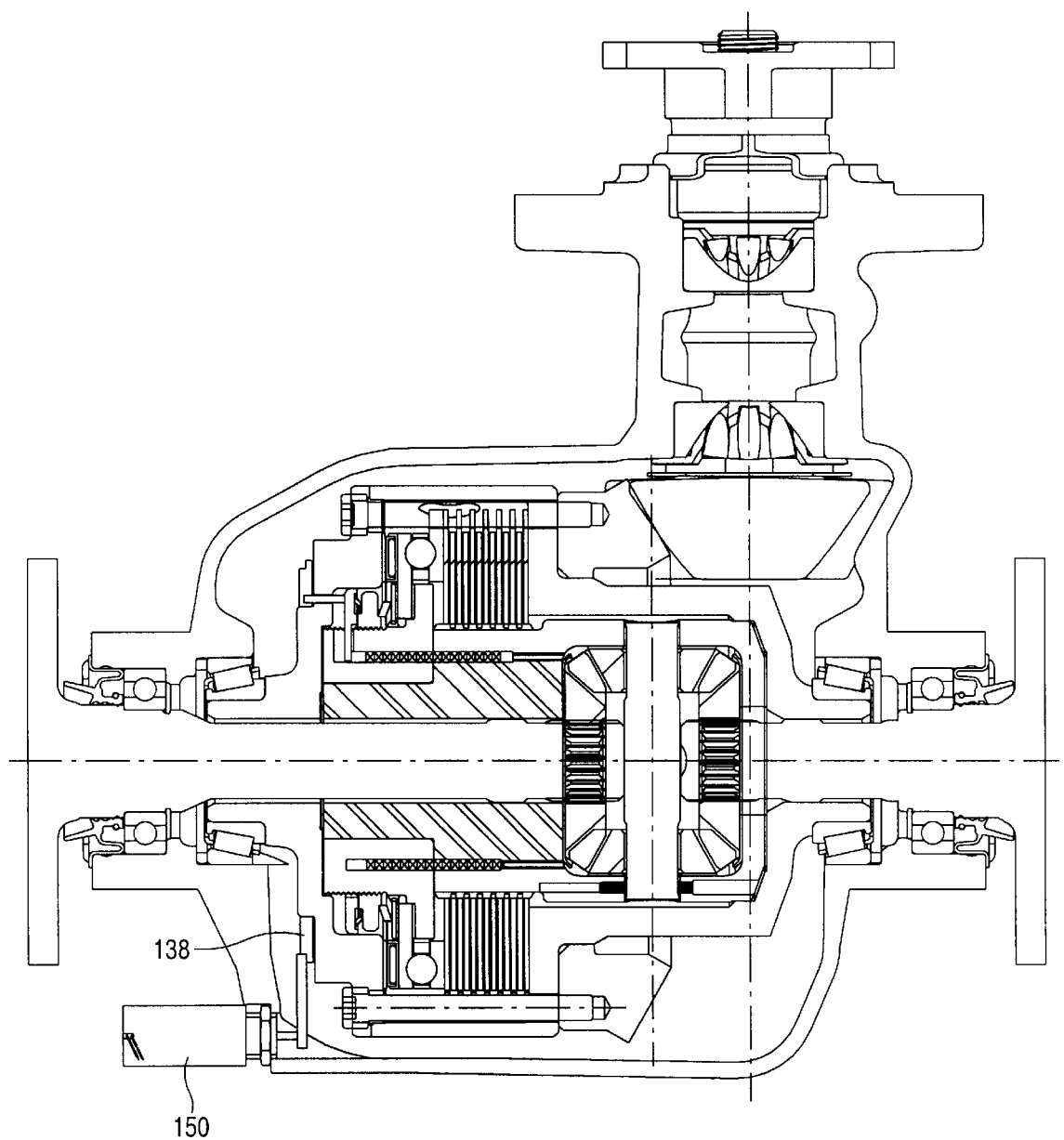
FIG. 5 is an axial cross-section of a wrap spring activated all wheel drive differential as assembled within the axle of a vehicle made in accordance with the teachings of the present invention, in an engaged condition.

FIG. 5 is an axial cross-section of a wrap spring activated all wheel drive differential as assembled within the axle of a vehicle made in accordance with the teachings of the present invention, in an engaged condition. FIG. 5 is not intended to limit this invention or limit the application of this invention. Also shown in FIG. 5 is an actuator 150 for positioning the control ring 138. In FIG. 5, the actuator 150 is an electrically powered one; however, other suitable actuators are readily available to perform the same purpose as envision in FIG. 5.

While the wrap spring activated all wheel drive differential of FIG. 5 is in the disengaged position torque is not transferred from the axle ring gear to the axle output shafts. This allows the other primary axle to carry the drive train torque in a 2WD configuration. However, when the wrap spring activated locking differential of FIG. 5 is in the engaged position, torque is transferred from the differential axle ring gear to the output shafts placing the vehicle in a 4WD condition.

From the foregoing description, it is clear that this invention allows for quick engagement and disengagement of an input member to an associated output member at large torsional capacities that exceed the limit of what is taught by prior art. Moreover, the ability to quickly lock and unlock a vehicle differential under either a torsionally loaded or unloaded condition is realized by this application of the wrap spring activated torque coupling.

This invention also utilizes a two piece bi-directional wrap spring hub design that allows for simple turning and broaching operations for use in its manufacture. Other one-piece hub designs require a deep annular counterbore that would require the use of much more expensive machining processes.

While the foregoing invention has been shown and described with reference to preferred embodiments, it will be understood that various changes in form and detail may be made therein without departing from the spirit and scope of this invention.

What is claimed is:

1. A torque coupling mechanism, comprising:
    a drive member;
    a driven member adapted to receive torque from said drive member;
    a clutch device for drivingly connecting said drive member and said driven member, said clutch device comprising first and second hub members coaxially disposed with respect to each other and a coiled wrap spring disposed within an annular counterbore provided in said hub members, wherein said spring is fixed at one end with respect to said first hub member and selectively fixed with respect to said second hub member,
    wherein said first hub member forms part of said driven member,
    wherein said first hub member comprises an output spline collar disposed within said drive member,
    wherein said output spline collar includes first and second splined interfaces which are driving an output shaft at said first splined interface and also being driven by clutch discs at said second splined interface.

2. The torque coupling mechanism of claim 1, wherein said drive member comprises a housing that at least partially encapsulates said clutch device.

3. The torque coupling mechanism of claim 1, wherein said first hub member is defined by first and second separate components defining a first portion of said annular counterbore therebetween, said separate components being rotatably coupled together.

4. The torque coupling mechanism of claim 1, wherein said clutch device forms part of a locking differential mechanism.

5. The torque coupling mechanism of claim 1, wherein said output spline collar comprises a first portion of aid annular counterbore which provides for a close clearance fit on both the outside and inside diameters of the wrap spring, and said output spline collar further comprises an additional counterbore within which one end of the wrap spring is fixedly disposed.

6. The torque coupling mechanism of claim 1, wherein said second hub member defines a wrap spring hub having a second portion of said annular counterbore, which provides a close clearance fit on both the outside and inside diameters of the wrap spring.

7. The torque coupling mechanism of claim 1, wherein said second hub member comprises at least one notched area to allow access to an end of the wrap spring.

8. The torque coupling mechanism of claim 7, further comprising a control pin collar that selectively fixes an end of the wrap spring to said second hub member, said control pin collar being disposed at said notched area.

9. The torque coupling mechanism of claim 1, wherein said second hub member further comprises an integrally formed annular ring projecting radially from said second hub member, said annular ring providing both a friction surface and a positive clamping surface.

10. A torque coupling mechanism, comprising:
    a drive member;
    driven member adapted to receive torque from said drive member;
    a clutch device for drivingly connecting said drive member and said driven member said clutch device comprising first and second hub members coaxially disposed with respect to each other and a coiled wrap spring disposed within an annular counterbore provided in said hub members, wherein said spring is fixed at one end with respect to said first hub member and selectively fixed with respect to said second hub member,
    wherein said first hub member forms part of said driven member,
    wherein said second hub member comprises a threaded region for engagement with a thread ring, and
    wherein said second hub member further comprises a splined interface for contact with a pilot clutch disc, and wherein a bias spring is interposed between said thread ring and said pilot clutch disc.

11. A torque coupling mechanism, comprising:
    a drive member;
    driven member adapted to receive torque from said drive member;
    a clutch device for drivingly connecting said drive member and said driven member, said clutch device comprising first and second hub members coaxially disposed with respect to each other and a coiled wrap spring disposed within an annular counterbore provided in said hub members, wherein said spring is fixed at one end with respect to said first hub member and selectively fixed with respect to said second hub member, wherein said first hub member forms part of said driven member,
    further comprising a ball ramp mechanism disposed between said drive member and said second hub member, said ball ramp mechanism comprising a pilot clutch ramp, balls, a ball separator plate, primary clutch ramp, and a thrust bearing assembly, wherein said thrust bearing assembly is disposed between said drive member and said pilot clutch ramp to provide a stiff low friction surface to interface with said pilot clutch ramp, and wherein said pilot clutch ramp and said primary clutch ramp each comprise bi-directional radial profile ramp surfaces for contact with said balls.

12. The torque coupling mechanism of claim 11, wherein said ball separating plate maintains proper spacing between said balls.

13. The torque coupling mechanism of claim 11, further comprising a pilot clutch mechanism comprising a threaded ring which when threaded on said second hub compresses a bias spring which in turn places a thrust load between a pilot clutch disc, said pilot clutch ramp, and an annular ring area, whereby said pilot clutch mechanism creates a slip clutch between said second hub and said pilot clutch ramp.

14. A torque coupling mechanism, comprising:

a drive member;

a driven member adapted to receive torque from said drive member;

a clutch device for drivingly connecting said drive member and said driven member, said clutch device comprising first and second hub members coaxially disposed with respect to each other and a coiled wrap spring disposed within an annular counterbore provided in said hub members, wherein said spring is fixed at one end with respect to said first hub member and selectively fixed with respect to said second hub member, wherein said first hub member forms part of said driven member, further comprising a primary clutch pack disposed between said drive member and said first hub member, wherein said primary clutch pack comprises a plurality of alternating discs and plates, of which said discs are splined to driven member and said plates are splined to the drive member.

15. A clutch mechanism for a differential assembly, comprising:

a differential case for a differential mechanism;

a torque input/output member for transmitting torque to and from said differential case;

a wrap spring clutch device for drivingly connecting said torque input/output member and said differential case, said clutch device comprising first and second hub members coaxially disposed with respect to an output gear of said differential mechanism and a wrap spring disposed within an annular counterbore provided in said hub members, wherein said wrap spring clutch activates a separately disposed clutch pack.

16. The clutch mechanism for a differential assembly according to claim 15, wherein said separately disposed clutch pack is interposed between said input/output member and said differential case.

17. The clutch mechanism for a differential assembly according to claim 15, wherein said input/output member comprises a housing that at least partially encapsulates said wrap spring clutch device.

18. The clutch mechanism for a differential assembly according to claim 15, wherein said first hub member comprises an output spline collar disposed within said input/output member.

19. The clutch mechanism for a differential assembly according to claim 18, wherein said output spline collar includes first and second splined interfaces which are capable of driving an output shaft at said first splined interface and also being driven by clutch discs at said second splined interface.

20. The clutch mechanism for a differential assembly according to claim 18, wherein said output spline collar comprises a first portion of said annular counterbore which provides for a close clearance fit on both the outside and inside diameters of the wrap spring, wherein said output spline collar further comprises an additional counterbore within which one end of the wrap spring is fixedly disposed.

21. The clutch mechanism for a differential assembly according to claim 15, wherein said second hub member defines a wrap spring hub having a second portion of said annular counterbore, which provides a close clearance fit on both the outside and inside diameters of the wrap spring.

22. The clutch mechanism for a differential assembly according to claim 15, wherein said second hub member comprises at least one notched area to allow access to an end of the wrap spring, and further comprising a control pin collar that selectively fixes an end of the wrap spring to said second hub member, said control pin collar being disposed at said notched area, said second hub member comprising a threaded region for engagement with a thread ring, and wherein said second hub member further comprises a splined interface for contact with a pilot clutch disc, and wherein a bias spring is interposed between said thread ring and said pilot clutch disc.

23. The clutch mechanism for a differential assembly according to claim 15, wherein said second hub member further comprises an integrally formed annular ring projecting radially from said second hub member, said annular ring providing both a friction surface and a positive clamping surface.

24. The clutch mechanism for a differential assembly according to claim 15, further comprising a ball ramp mechanism disposed between said drive member and said second hub member, said ball ramp mechanism comprising a pilot clutch ramp, balls, a ball separator plate, primary clutch ramp, and a thrust bearing assembly.

25. The clutch mechanism for a differential assembly according to claim 24, wherein said thrust bearing assembly is disposed between said input/output member and said pilot clutch ramp to provide a stiff low friction surface to interface with said pilot clutch ramp.

26. The clutch mechanism for a differential assembly according to claim 24, wherein said pilot clutch ramp and said primary clutch ramp each comprise bi-directional radial profile ramp surfaces for contact with said balls, and wherein said ball separating plate maintains proper spacing between said balls.

27. The clutch mechanism for a differential assembly according to claim 24, further comprising a pilot clutch mechanism comprising a threaded ring which when threaded on said second hub compresses a bias spring which in turn places a thrust load between a pilot clutch disc, said pilot clutch ramp, and an annular ring area, whereby said pilot clutch mechanism creates a slip clutch between said second hub and said pilot clutch ramp.

28. The clutch mechanism for a differential assembly according to claim 15, further comprising a primary clutch pack disposed between said input/output member and said first hub member, wherein said primary clutch pack comprises a plurality of alternating discs and plates, of which said discs are splined to differential member and said plates are splined to the input/output member.

* * * * *